(12) United States Patent
Miao et al.

(10) Patent No.: US 12,730,856 B2
(45) Date of Patent: Sep. 8, 2026

(54) DEVICE AND METHOD FOR PARALLELIZING ANALOG IN-MEMORY COMPUTING BASED ON FREQUENCY DIVISION MULTIPLEXING

(71) Applicant: NANJING UNIVERSITY, Nanjing (CN)

(72) Inventors: Feng Miao, Nanjing (CN); Shijun Liang, Nanjing (CN); Cong Wang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 497 days.

(21) Appl. No.: 17/763,515

(22) PCT Filed: May 31, 2021

(86) PCT No.: PCT/CN2021/097313
§ 371 (c)(1),
(2) Date: Nov. 17, 2022

(87) PCT Pub. No.: WO2022/236885
PCT Pub. Date: Nov. 17, 2022

(65) Prior Publication Data

US 2024/0054177 A1 Feb. 15, 2024

(30) Foreign Application Priority Data

May 14, 2021 (CN) ........................ 202110526207.2

(51) Int. Cl.
*G06F 17/16* (2006.01)

(52) U.S. Cl.
CPC .................................. *G06F 17/16* (2013.01)

(58) Field of Classification Search
CPC ...................................................... G06F 17/16
See application file for complete search history.

(56) References Cited

U.S. PATENT DOCUMENTS

| | | | | |
|---|---|---|---|---|
| 2003/0142764 | A1* | 7/2003 | Keevill | H04L 27/2678 714/795 |
| 2020/0133990 | A1* | 4/2020 | Mathuriya | G06F 17/16 |
| 2023/0074229 | A1* | 3/2023 | Jia | G06F 15/7821 |

* cited by examiner

*Primary Examiner* — Michael D. Yaary
(74) *Attorney, Agent, or Firm* — CBM PATENT CONSULTING, LLC

(57) ABSTRACT

A device for parallelizing analog in-memory computing based on frequency division multiplexing comprises an input circuit, a memory array and an output circuit, wherein an input of the memory array is connected with an output of the input circuit, and an output of the memory array is connected with an input of the output circuit; the input circuit modulates k data in each row of m×k input data matrix into each path of frequency division multiplexing signals for output by using k different frequency sources; the memory array comprises m×n memory elements, memory weights thereof form an m×n matrix, and m×1 input frequency division multiplexing signals are parallel-processed in the memory array; and the output circuit demodulates and separates each path of frequency division multiplexing signals output by the memory array into k data.

8 Claims, 6 Drawing Sheets

DEVICE AND METHOD FOR PARALLELIZING ANALOG IN-MEMORY COMPUTING BASED ON FREQUENCY DIVISION MULTIPLEXING

TECHNICAL FIELD

The present invention relates to a device and a method for in-memory computing, and in particular to a device and a method for parallelizing analog in-memory computing based on frequency division multiplexing.

BACKGROUND

When von Neumann architecture is faced with computing tasks with high performance requirements such as artificial intelligence algorithms, a separate storage and computing architecture thereof results in a large amount of energy waste and reduced computing efficiency. In-memory computing can be performed using a memory array, which, unlike previous von Neumann computing architectures, adopts analog signals for completing computing process in the memory array. This novel computing architecture has great advantages in power consumption and speed, and is a novel computing architecture which is mainly researched and developed in the post von Neumann times. According to the existing data, the above-mentioned existing in-memory computing means can perform a dot product operation of a vector and a matrix in an upper computing cycle by using a single memory array.

A dot product operation of a vector and a matrix in a computing cycle can be realized by using a single memory assay, while it is impossible to realize parallel dot product operations of a plurality of vectors and matrices by using the single memory array. In order to realize the dot product operations of a plurality of vectors and matrices, a mode that a plurality of hardware modules work simultaneously is used for parallel computing in the prior art. However, a scheme using a plurality of memory arrays results in a large increase in chip area, and an increase in hardware cost and system power consumption, and also places higher requirements on yield and uniformity of the replicated memory arrays. These all limit the potential, feasibility and economic cost of existing schemes for realizing parallel in-memory computing.

SUMMARY

Objectives: The present invention aims to provide a device and a method for parallelizing analog in-memory computing based on frequency division multiplexing, which solves the problems of the requirements of the existing parallelization scheme on a plurality of sets of the same memory arrays, overlarge chip area and overhigh system power consumption caused by the existing parallelization scheme, and high requirements of the hardware copying process of the existing parallelization scheme on parameters such as yield and uniformity.

Technical scheme: The device for parallelizing analog in-memory computing based on frequency division multiplexing described in the present invention comprises an input circuit, a memory array and an output circuit, an input of the memory array is connected with an output of the input circuit, and an output of the memory array is connected with an input of the output circuit; the input circuit modulates k data in each row of m×k input data matrix into each path of frequency division multiplexing signals for output by using k different frequency sources; the memory array comprises at least m×n memory elements, memory weights thereof form an m×n matrix, and mxl input frequency division multiplexing signals are parallel-processed in the memory array; and the output circuit demodulates and separates each path of frequency division multiplexing signals output by the memory array into k data.

The input circuit comprises an m×k up-conversion mixer array and an m×1 adder array, inputs of the up-conversion mixer array are input signal data and a frequency source, and outputs of each row of up-conversion mixers are connected with inputs of the row of adders; and the up-conversion mixers comprise a mixer and a high-pass filter.

The input circuit comprises an m×k memory array, weights stored in the memory array are input signal data, and the inputs of the memory array are frequency sources of k different frequencies.

The memory elements comprise at least one of a resistive memory, a floating gate memory, a phase change memory, a magnetic tunneling junction memory, a memristor, a flash memory, a dynamic random access memory or a static random access memory.

The output circuit comprises an n×k down-conversion mixer array, inputs of the down-conversion mixer array are output signals of the frequency source and the memory array; and the down-conversion mixers comprise a second mixer and a low-pass filter.

The method for parallelizing analog in-memory computing based on frequency division multiplexing described in the present invention comprises:

(1) modulating k data in each row of m×k input data matrix into each path of signals for output by frequency sources of k different frequencies, and generating m paths of frequency division multiplexing signals;

(2) inputting the m paths of frequency division multiplexing signals into a memory array, and completing in-memory computing with the memory array to obtain n paths of output signals; and (3) demodulating and decomposing each path of output signals in the n paths of output signals in the memory array into k different signals.

In the step (1), the input signals and the frequency division multiplexing signals are analog signals.

In the step (1), the m paths of frequency division multiplexing signals are generated by frequency domain signal synthesis, and each path of signals are multiplexed with k different frequency sources.

In the step (2), the in-memory computing is multiplication operation of input signal data matrices and memory weight matrices.

In the step (3), each path of output signals are demodulated and decomposed into k output signals by frequency domain signal separation to obtain n×k output signal data.

Beneficial effects: Compared with the prior art, the present invention has significant advantages of realizing super large-scale parallel in-memory computing on the same memory array, realizing multiplication operation of a matrix and another matrix in a computing cycle, simplifying the difficulty of realizing parallel in-memory computing, improving the utilization efficiency of hardware, and improving the energy efficiency ratio and the computation density of a system.

DETAILED DESCRIPTION

The technical scheme of the present invention is further described below with reference to the drawings.

Figure 1:
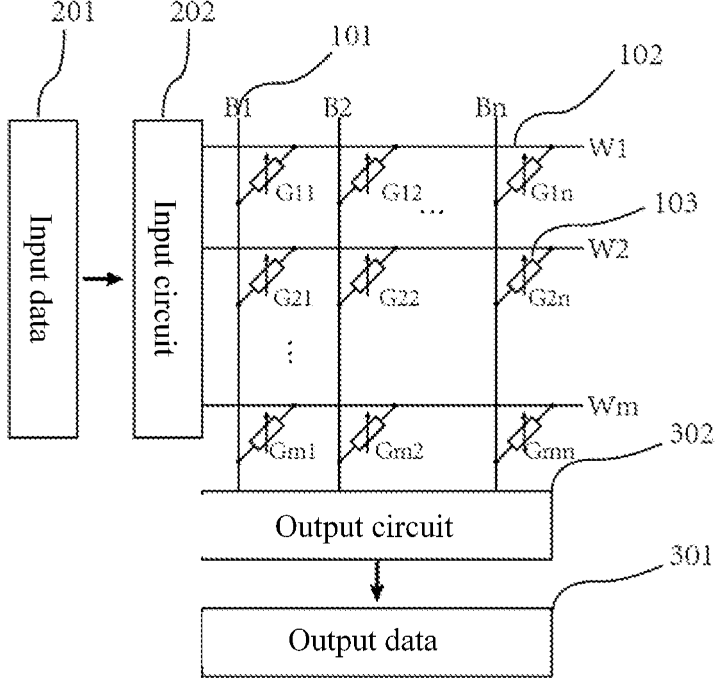
FIG. 1 is a schematic diagram of the present invention.
Figure 2:
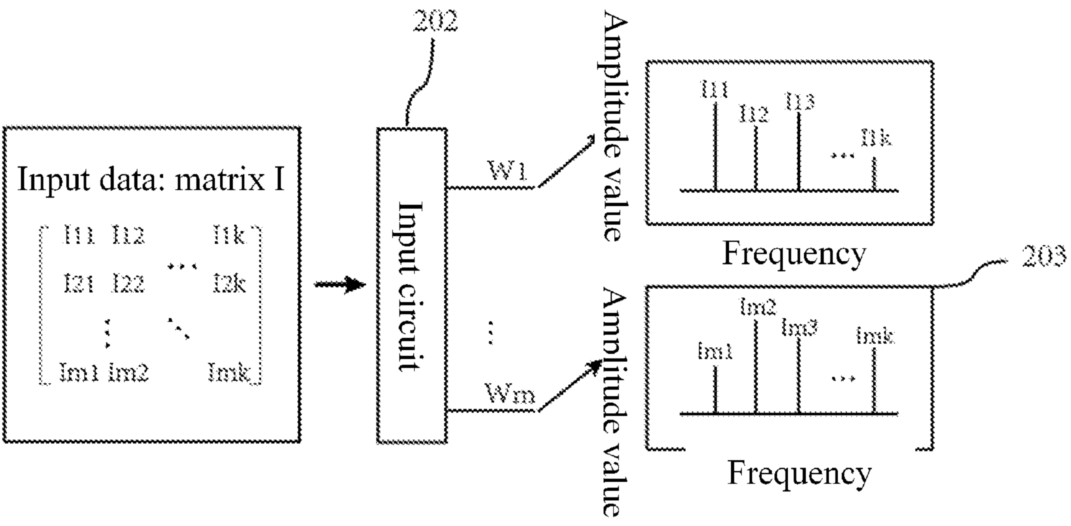
FIG. 2 is an organization mode schematic diagram of the input data of the present invention.
Figure 3:
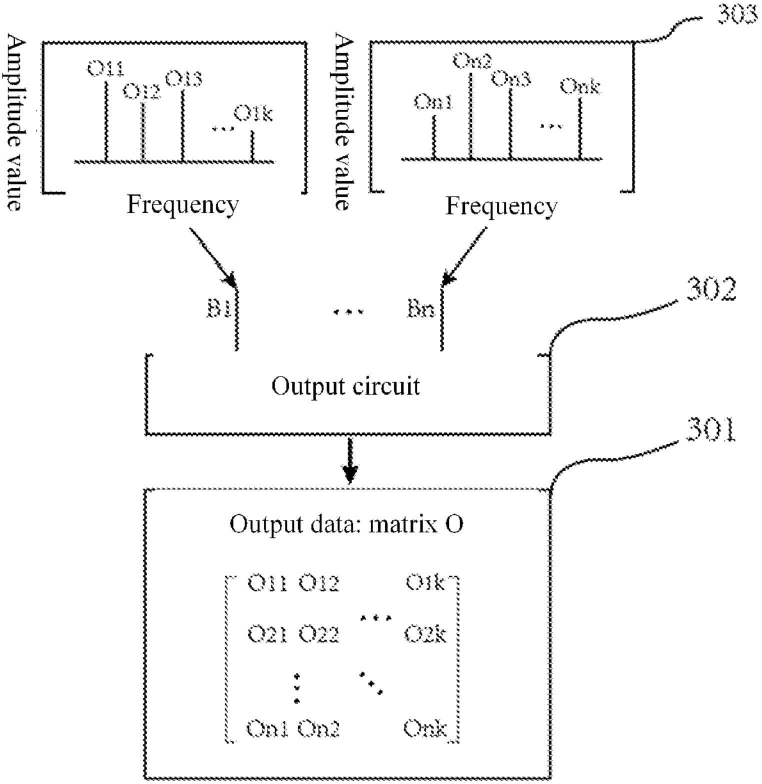
FIG. 3 is an organization mode schematic diagram of the output data of the present invention.

As can be seen from FIGS. 1-3, the device for parallelizing analog in-memory computing based on frequency division multiplexing described in the present invention comprises an input circuit, a memory array and an output circuit, an input of the memory array is connected with an output of the input circuit, and an output of the memory array is connected with an input of the output circuit; the input circuit modulates k data in each row of m×k input data matrix into each path of frequency division multiplexing signals for output by using k different frequency sources; the memory array comprises at least m×n memory elements, memory weights thereof form an m×n matrix, and mxl input frequency division multiplexing signals are parallel-processed in the memory array; and the output circuit demodulates and separates each path of frequency division multiplexing signals output by the memory array into k data. The memory elements include at least one of a resistive memory, a floating gate memory, a phase change memory, a magnetic tunneling junction memory, a memristor, a flash memory, a dynamic random access memory or a static random access memory, but are not limited to the above-mentioned non-volatile memory elements. The m, k and n are any integer.

Figure 4:
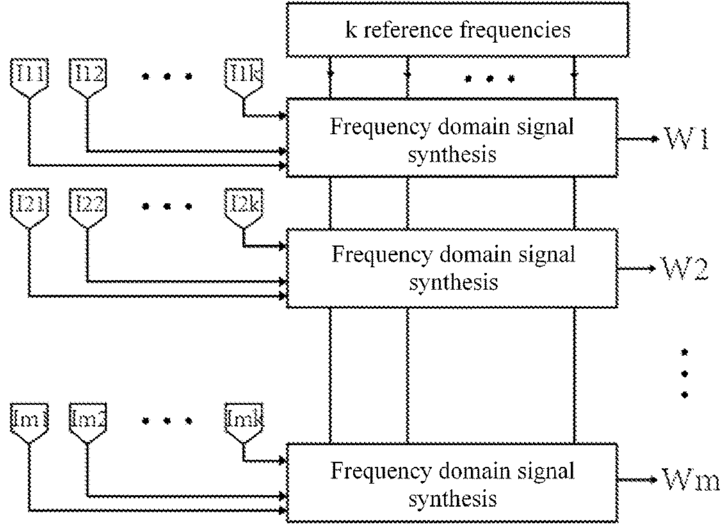
FIG. 4 is a diagram of an operation of the input circuit of the present invention.
Figure 5:
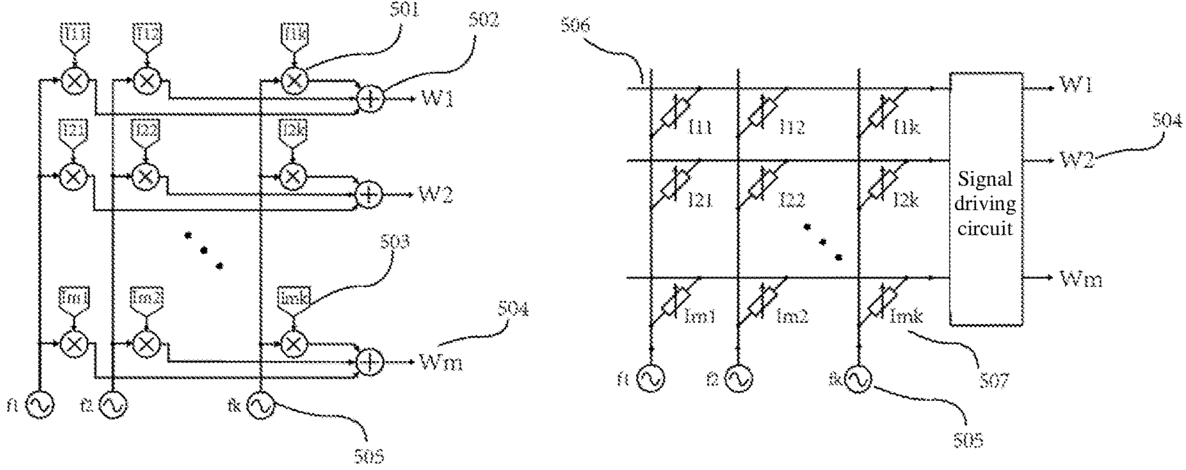
FIG. 5 is a diagram of an embodiment of the input circuit of the present invention.

FIG. 4 shows an operation of the input circuit. In this embodiment, the principle of the input circuit is shown in FIG. 5. In one approach, an input circuit is mainly formed by using up-conversion mixers and adders. The up-conversion mixers comprise a mixer and a high-pass filter. Frequencies of the frequency sources are selected from f1 to fk, each frequency source is modulated with m×k input signals of the input circuit by the up-conversion mixer, then different frequency signals are added in the same path, and m paths of frequency division multiplexing signals are generated.

In another approach, an input circuit is mainly formed by using a memory array, and weights stored in the memory array are input signal data. Frequencies of the frequency sources are selected from f1 to fk, each frequency source is multiplied by weight matrices stored in the memory array, and m paths of frequency division multiplexing signals are generated. The weight matrices stored in the memory are in one-to-one correspondence with the weight matrices of the input signal data.

Figure 6:
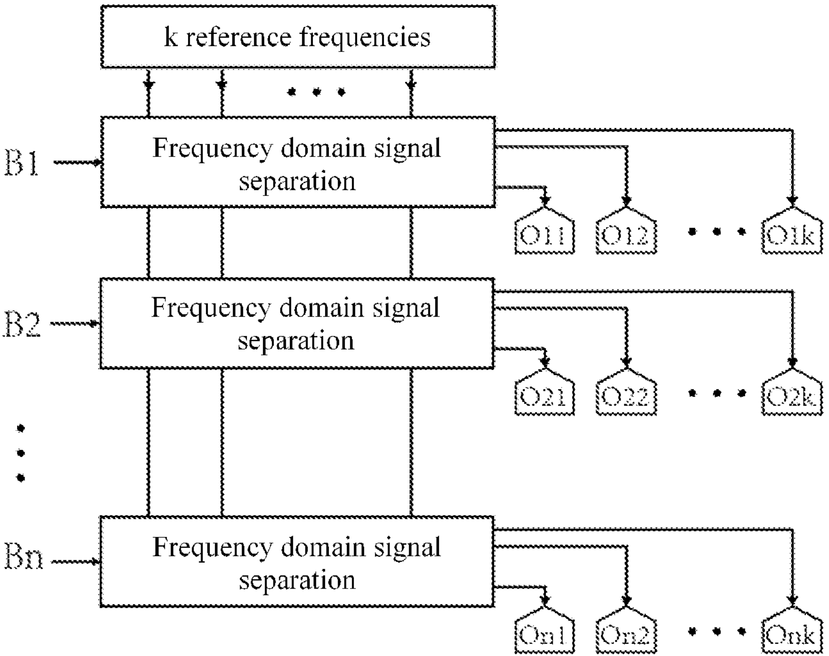
FIG. 6 is a diagram of an operation of the output circuit of the present invention.
Figure 7:
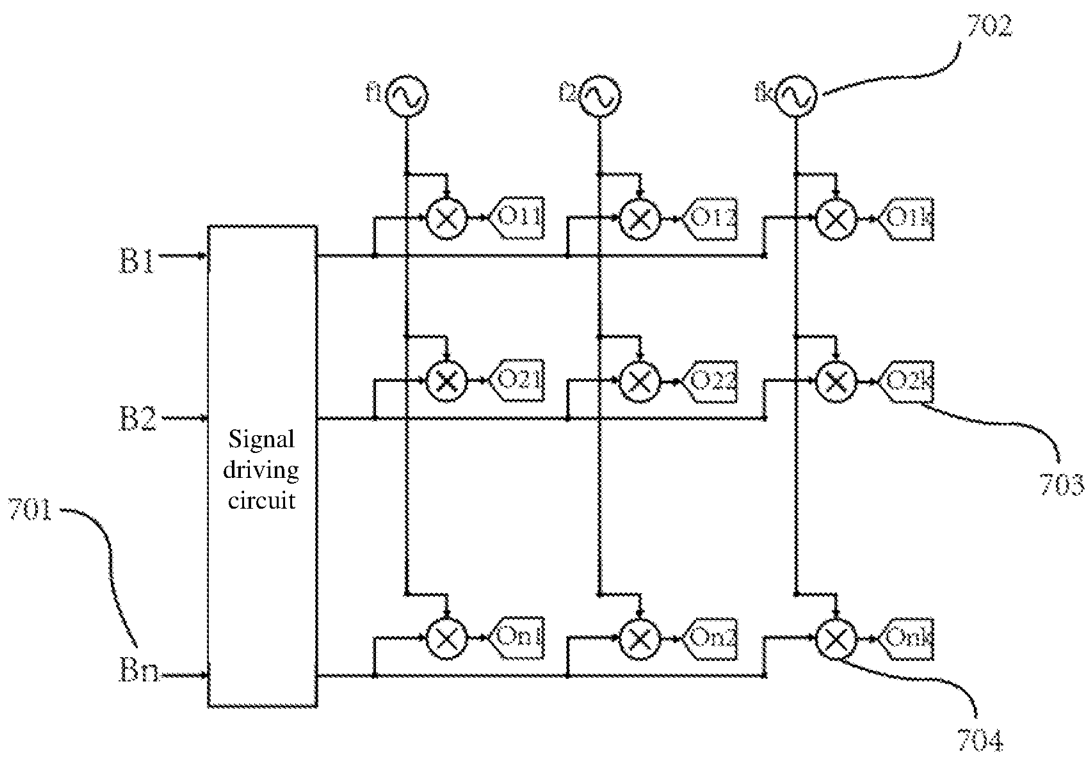
FIG. 7 is a diagram of an embodiment of the output circuit of the present invention.

FIG. 6 shows an operation of the output circuit. In this embodiment, the principle of the output circuit is shown in FIG. 7. Frequency domain signal separation is realized using down-conversion mixers and different frequency sources. The down-conversion mixers comprise a mixer and a low-pass filter. Input signal lines of the output circuit are connected with output signal lines of the memory array, and frequencies of the frequency sources are selected from f1 to fk and are in one-to-one correspondence with frequency sources of the input circuit.

Based on the device for the super large-scale parallelization of analog in-memory computing based on frequency division multiplexing described in the present invention, the method for parallelizing analog in-memory computing based on frequency division multiplexing described in the present invention comprises:

(1) modulating k data in each row of m×k input data matrix into each path of signals for output by frequency sources of k different frequencies, and generating m paths of frequency division multiplexing signals, wherein the input signals and the frequency division multiplexing signals are analog signals, m paths of frequency division multiplexing signals are generated by frequency domain signal synthesis, and each path of signals are multiplexed with k different frequency sources;

(2) inputting the m paths of frequency division multiplexing signals into a memory array, and completing in-memory computing with the memory array to obtain n paths of output signals, wherein the in-memory computing is multiplication operation of input signal data matrices and memory weight matrices; and (3) demodulating and decomposing each path of output signals in the n paths of output signals in the memory array into k different signals, and demodulating and decomposing each path of output signals into k output signals by frequency domain signal separation to obtain n×k output signal data.

In this embodiment, a memristor array is used as a memory array, and the operation principle thereof is as follows:

(1) A memristor crossbar array is used as a core of the memory and computing integration, and an electric conductance value stored therein is a weight matrix G.

(2) m paths of voltage signals are generated in the input circuit, the voltage signals have k frequency channels, and a relationship between the signal intensity of each frequency channel and an m×k input data matrix I meets the one-to-one correspondence relationship shown in FIG. 2.

(3) There are k frequency channels on the current signals collected by n output circuits, and a relationship between the signal intensity of each frequency channel and an n×k output data matrix O meets the one-to-one correspondence relationship shown in FIG. 3.

(4) The resulting value of 0 is proportional to $G^T$×I, and the $G^T$ is a transposed matrix of the G. For example, if the input signal is a unit matrix, the output matrix is proportional to the transposed matrix G T of the weight matrix.

The present invention can simultaneously realize multiple vector-by-matrix dot production operations in a memory array, that is, the super large-scale parallelization of the vector-matrix dot multiplication operation is completed, and the matrix-by-matrix multiplication in a computing cycle is realized.

The method of the present invention has the capability of multi-stage cascade operation, and the output signals or data can be directly used as the next input signals or data.

What is claimed is:

1. A device for parallelizing analog in-memory computing based on frequency division multiplexing, comprising: an input circuit, a memory array and an output circuit; wherein an input of the memory array is connected with an output of the input circuit, and an output of the memory array is connected with an input of the output circuit;

the input circuit modulates k data in each row of m×k input data matrix into each path of frequency division multiplexing signals for output by using k different frequency sources; wherein the input circuit comprises an m×k up-conversion mixer array and an m×1 adder array, inputs of the up-conversion mixer array are input signal data and a frequency source, and outputs of each row of up-conversion mixers are connected with inputs of the row of adders; and the up-conversion mixers comprise a mixer and a high-pass filter;

the memory array comprises m×n memory elements, memory weights thereof form an m×n matrix, and m×1 input frequency division multiplexing signals are parallel-processed in the memory array; and the output circuit demodulates and separates each path of frequency division multiplexing signals output by the memory array into k data.

2. The device for parallelizing analog in-memory computing based on frequency division multiplexing according to claim 1, wherein: the input circuit comprises an m×k memory array, weights stored in the memory array are input signal data, and the inputs of the memory array are frequency sources of k different frequencies.

3. The device for parallelizing analog in-memory computing based on frequency division multiplexing according to claim 1, wherein: the memory elements comprise at least one of a resistive memory, a floating gate memory, a phase change memory, a magnetic tunneling junction memory, a memristor, a flash memory, a dynamic random access memory or a static random access memory.

4. The device for parallelizing analog in-memory computing based on frequency division multiplexing according to claim 1, wherein: the output circuit comprises an n×k down-conversion mixer array, inputs of the down-conversion mixer array are output signals of the frequency source and the memory array; and the down-conversion mixers comprise a second mixer and a low-pass filter.

5. A method for parallelizing analog in-memory computing based on frequency division multiplexing, comprising:

i) modulating k data in each row of m×k input data matrix into each path of signals for output by frequency sources of k different frequencies, and generating m paths of frequency division multiplexing signals; wherein the m paths of frequency division multiplexing signals are generated by frequency domain signal synthesis, and each path of signals are multiplexed with k different frequency sources;

ii) inputting the m paths of frequency division multiplexing signals into a memory array, and completing in-memory computing with the memory array to obtain n paths of output signals; and iii) demodulating and decomposing each path of output signals in the n paths of output signals in the memory array into k different signals.

6. The method for parallelizing analog in-memory computing based on frequency division multiplexing according to claim 5, wherein:

in the step i), the input signals and the frequency division multiplexing signals are analog signals.

7. The method for parallelizing analog in-memory computing based on frequency division multiplexing according to claim 5, wherein:

in the step ii), the in-memory computing is multiplication operation of input signal data matrices and memory weight matrices.

8. The method for parallelizing analog in-memory computing based on frequency division multiplexing according to claim 5, wherein:

in the step iii), each path of output signals are demodulated and decomposed into k output signals by frequency domain signal separation to obtain n×k output signal data.

* * * * *